United States Patent
Bräutigam et al.

(10) Patent No.: US 9,838,529 B2
(45) Date of Patent: Dec. 5, 2017

(54) METHOD FOR SECURING AN INTERIOR OF A MOTOR VEHICLE

(71) Applicant: AUDI AG, Ingolstadt (DE)

(72) Inventors: Heribert Bräutigam, Ingolstadt (DE); Eckart Donner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/325,389

(22) PCT Filed: Feb. 6, 2015

(86) PCT No.: PCT/EP2015/000245
§ 371 (c)(1),
(2) Date: Jan. 10, 2017

(87) PCT Pub. No.: WO2016/005013
PCT Pub. Date: Jan. 14, 2016

(65) Prior Publication Data
US 2017/0171379 A1   Jun. 15, 2017

(30) Foreign Application Priority Data

Jul. 11, 2014 (DE) .......................... 10 2014 010 345

(51) Int. Cl.
*H04M 3/00*   (2006.01)
*H04M 1/725*   (2006.01)
(Continued)

(52) U.S. Cl.
CPC .......... *H04M 1/72577* (2013.01); *B60R 21/01* (2013.01); *B60R 21/16* (2013.01)

(58) Field of Classification Search
CPC ..... B60R 21/01; B60R 21/16; H04M 1/72577
(Continued)

(56) References Cited

U.S. PATENT DOCUMENTS

| 8,145,199 B2 * | 3/2012 | Tadayon | H04B 5/0062 |
| | | | 455/418 |
| 8,295,854 B2 * | 10/2012 | Osann, Jr. | H04M 1/67 |
| | | | 340/466 |

(Continued)

FOREIGN PATENT DOCUMENTS

DE     100 07 014 A1    10/2001
DE     102011112370 A1   3/2013
(Continued)

OTHER PUBLICATIONS

International Preliminary Report on Patentability dated Jan. 26, 2017 in corresponding International Patent Application No. PCT/EP2015/000245.

(Continued)

*Primary Examiner* — William Nealon
(74) *Attorney, Agent, or Firm* — Staas & Halsey LLP

(57) ABSTRACT

A position of a mobile terminal in the interior of a motor vehicle is sensed by a sensor device. The sensed position is taken as a basis for a control device of the motor vehicle to ascertain whether the mobile terminal adopts a position within a predetermined safety area to be kept clear between a predetermined interior equipment component of the motor vehicle, for example an airbag, and a user of the motor vehicle. When such a position within the safety area is adopted or exists, prevention of use of the mobile terminal within the safety area is brought about by a safety check device. In this case, a restraining device can return or restrain the mobile terminal from the safety area, for example.

15 Claims, 1 Drawing Sheet

(51) Int. Cl.
  *B60R 21/01* (2006.01)
  *B60R 21/16* (2006.01)
(58) Field of Classification Search
  USPC .......................................................... 455/418
  See application file for complete search history.

(56) References Cited

U.S. PATENT DOCUMENTS

| | | | | |
|---|---|---|---|---|
| 8,620,354 | B2* | 12/2013 | Beasley | H04M 1/72577 455/41.2 |
| 8,634,816 | B2* | 1/2014 | Xiao | H04W 4/027 455/417 |
| 9,148,513 | B2* | 9/2015 | Tadayon | H04M 3/53 |
| 9,609,621 | B2* | 3/2017 | Osann, Jr. | H04W 64/006 |
| 2003/0042348 | A1* | 3/2003 | Salentine | A45F 5/004 242/380 |
| 2005/0184860 | A1 | 8/2005 | Taruki et al. | |
| 2010/0006610 | A1 | 1/2010 | Stinnett et al. | |
| 2010/0206976 | A1* | 8/2010 | Salentine | A45F 5/004 242/379.2 |
| 2010/0279626 | A1 | 11/2010 | Bradley et al. | |
| 2011/0039581 | A1* | 2/2011 | Cai | G01S 19/14 455/456.4 |
| 2011/0105097 | A1 | 5/2011 | Tadayon et al. | |
| 2011/0151941 | A1* | 6/2011 | Chan | B65H 75/4431 455/569.1 |
| 2012/0282908 | A1 | 11/2012 | Nicolini | |
| 2015/0289634 | A1* | 10/2015 | Chavez | A45F 5/004 224/162 |
| 2017/0171379 | A1* | 6/2017 | Brautigam | H04M 1/72577 |

FOREIGN PATENT DOCUMENTS

| | | |
|---|---|---|
| DE | 102012014074 A1 | 1/2014 |
| EP | 2 736 180 A1 | 5/2014 |
| WO | 2013/043228 A1 | 3/2013 |

OTHER PUBLICATIONS

German Office Action for Application No. 102014010345.5 dated Nov. 28, 2014.
International Search Report for PCT/EP2015/000245 dated May 12, 2015.
German Search Report for Application No. 102014010345.5 dated Feb. 23, 2015.
PCT/EP2015/000245, Feb. 6, 2015, Heribert Bräutigam et al., AUDI AG.
DE102014010345.5, Jul. 11, 2014, Heribert Bräutigam et al., AUDI AG.
Office Action dated Jul. 28, 2017 in corresponding Chinese Patent Application No. 201580037732.0.

* cited by examiner

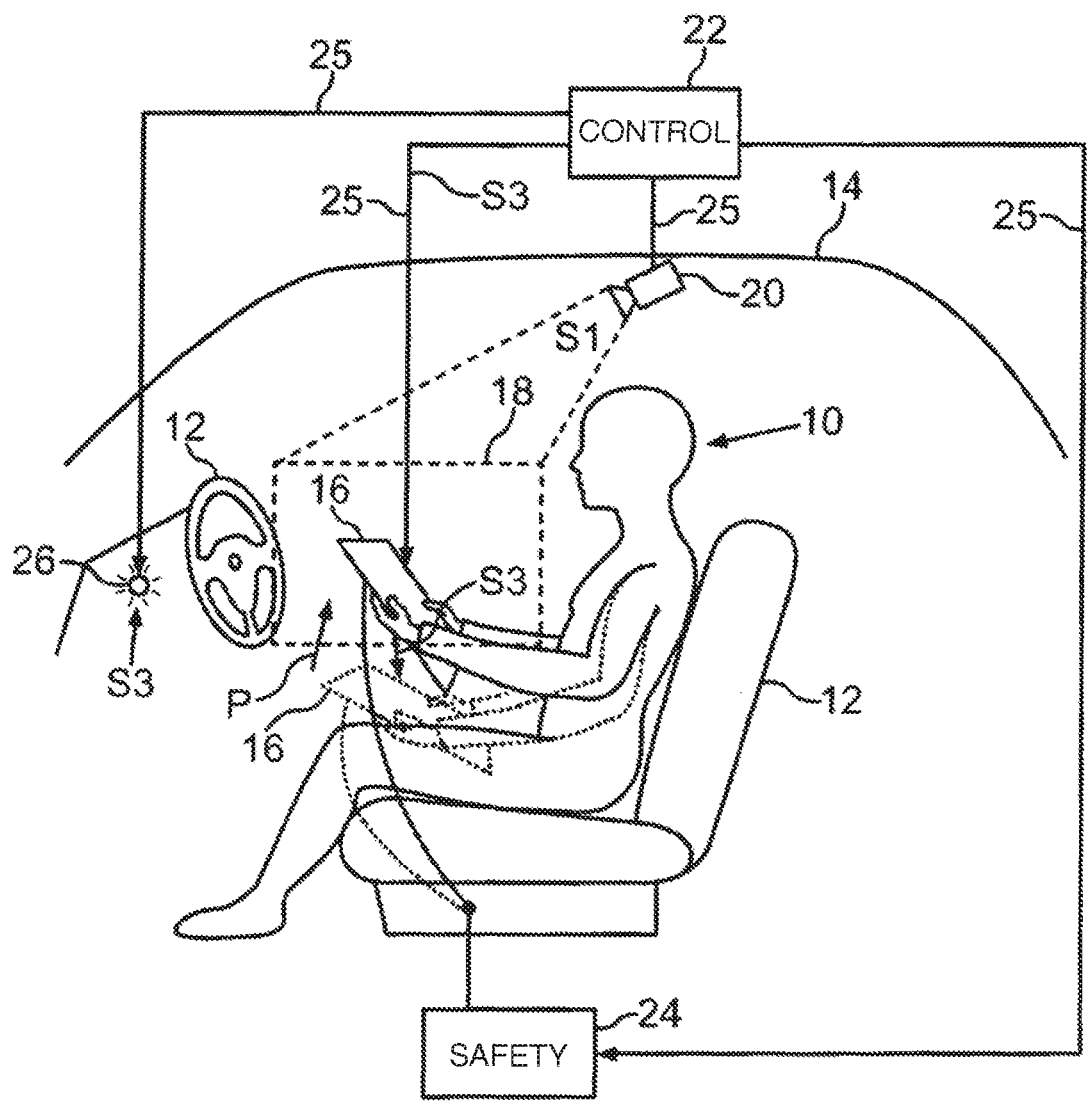

METHOD FOR SECURING AN INTERIOR OF A MOTOR VEHICLE

CROSS REFERENCE TO RELATED APPLICATIONS

This application is the U.S. national stage of International Application No. PCT/EP2015/000245, filed Feb. 6, 2015 and claims the benefit thereof. The International Application claims the benefits of German Application No. 102014010345.5 filed on Jul. 11, 2014, both applications are incorporated by reference herein in their entirety.

BACKGROUND

Described below is a method for securing an interior of a motor vehicle that involves a sensor device sensing a position of a mobile terminal within the motor vehicle. On the basis of the position, the mobile terminal can be actuated. Also described are a corresponding control device and a correspondingly equipped automobile.

A user of a motor vehicle may have the opportunity to perform secondary activities such as writing emails, using social networks or the Internet, for example. During fully automated driving of the motor vehicle, a congestion pilot, for example, undertakes control of the motor vehicle as an automated driving function a driver could even devote himself to such an activity. Although the user does not himself need to pay attention to what is happening in the traffic during such an automated function, for example, it may be appropriate for him to observe any further safety rules. This may include, by way of example, leaving predetermined safety areas clear, for example an area between a steering wheel or an airbag and the user, so that when the airbag is triggered, for example, there is the assurance that the safety area contains no items that the airbag could move uncontrollably. To avoid the airbag triggering by way of example, it has previously been proposed that the occupant does not use a mobile terminal of his own. A user has to date been reliant on his motor vehicle having an operator control and input unit dedicated to the motor vehicle, that is to say a keyboard and/or a touchpad, for example.

US 2005 184860 A1 discloses a method and an apparatus for controlling a portable information device in which a sensed vehicle state can be taken as a basis for disabling a function of the mobile terminal. To this end, by way of example, the function is disabled as soon as the motor vehicle moves.

DE 100 07 014 A1 describes a method and an apparatus for identifying seat occupancy, with a position of a person in relation to a gas impact bag in a vehicle being sensed.

A method for controlling an operating state of a mobile terminal is known from DE 10 2012 014 074 A1. In order to avoid distracting the driver from what is happening in the traffic, it is possible in this case for the visual display of content that is displayed by the mobile terminal to be prevented.

SUMMARY

An aspect of the method is improved checking on items of a user of the motor vehicle.

The method is based on the concept of sensing a position of the mobile terminal in the interior of the motor vehicle. On the basis of the sensed position, an operating state of the mobile terminal can be controlled or the user can be warned. The user can thus use a mobile terminal of his own during a trip without the mobile terminal needing to be equipped with special electronics that are compatible for the motor vehicle. The method undertakes a check using the safety area in this case.

The method is accordingly used for securing an interior of a motor vehicle, with a position of the mobile terminal, for example a tablet PC or a cell phone, first of all being sensed by a sensor device. In this case, a sensor device is a device that has a measured variable pickup, that is to say a sensor, or multiple sensors. On the basis of the sensed position, a control device of the motor vehicle, for example a controller or a microcontroller, ascertains whether the mobile terminal adopts a position within a predetermined safety area to be kept clear between a predetermined interior equipment component of the motor vehicle and a user of the motor vehicle. In this case, the control device is designed for electronic data processing, for generating a control signal and for controlling a further electronic component. The control device includes, by way of example, a controller or a microcontroller, that is to say a semiconductor chip, that contains a processor and at the same time also peripheral functions.

In this case, the predetermined interior equipment component of the motor vehicle may be a steering wheel and/or pedals and/or a safety system of the motor vehicle, particularly an airbag. The areas between such an interior equipment component and the user are particularly sensitive areas whose monitoring by the method contributes to the safety of the user during the trip.

When a position of the mobile terminal within the predetermined safety area to be kept clear is adopted, such as when a position of the mobile terminal within the predetermined safety area to be kept clear exists, a safety check device brings about prevention of use of the mobile terminal within the safety area. In other words, the safety check device prevents use of the mobile terminal within the safety area and/or when the mobile terminal moves into the safety area and/or when the mobile terminal moves toward the safety area if the control device ascertains that the mobile terminal adopts a position within a predetermined safety area to be kept clear between a predetermined interior equipment component of the motor vehicle and a user of the motor vehicle.

The method contributes substantially to an important safety area in the motor vehicle remaining clear of uncontrollable items. As a result, the user, that is to say the occupant of the motor vehicle, does not himself need to constantly ensure that he keeps the mobile terminal outside a suitable area of use, that is to say that the motor vehicle thus monitors use of the mobile terminal.

The ascertainment of whether the mobile terminal adopts a position within the predetermined safety area to be kept clear can be effected, in accordance with an embodiment of the method, such that it is ascertained whether the mobile terminal is within the safety area and/or moves into the predetermined safety area. The ascertainment of whether the mobile terminal moves into the predetermined safety area, and/or moves toward the safety area, advantageously contributes to it being possible to identify a user intention of the user outside the safety area even before the mobile terminal is actually in the safety area. In this case, the sensor device can use a motion sensor and/or a camera of the motor vehicle, for example.

If the sensor device also includes, in accordance with a further embodiment of the method, a sensor device of the motor vehicle, such as a motion sensor of the motor vehicle and/or a light barrier of the motor vehicle and/or a camera of the motor vehicle, then components that are already present in the motor vehicle, that is to say sensors that are already present, can be used without the motor vehicle needing to be upgraded. The sensor device can likewise include a device for near field communication of the motor vehicle, for example a near field communication compatible transceiver of the motor vehicle. In addition, the method can be performed without the control device needing to be coordinated with an operating system of the mobile terminal. The user can therefore also use mobile terminals of his own and is not reliant on the mobile terminals included by the motor vehicle manufacturer. The sensing of the position of the mobile terminal can in this case be alternatively or additionally effected by sensing a change of position of the mobile terminal.

The sensing of the position of the mobile terminal and/or a change of position of the mobile terminal can additionally or alternatively be effected by a sensor device of the mobile terminal, e.g., by an inclination sensor of the mobile terminal or a device for near field communication of the mobile terminal, for example a near field communication compatible transceiver of the mobile terminal. This further embodiment of the method allows sensors of the mobile terminal to be used, and a motor vehicle that has none of the aforementioned sensors does not to have to be upgraded.

The bringing about of the prevention of the use of the mobile terminal within the safety area can be effected, in accordance with a further embodiment of the method, by changing the operating state of the mobile terminal, for example by switching off the mobile terminal or by selecting an idle mode. As a result, the control device of the motor vehicle has a direct influence on the mobile terminal. In an advantageous development, an activation state of the mobile device can be sensed in this case, and, if the mobile terminal is activated within the safety area, then the mobile terminal can be deactivated. As a result, the driver immediately notices when he has moved the mobile terminal into the safety area, and can continue to use the mobile terminal only when the mobile terminal remains in a safe position again.

Alternatively or additionally, the prevention of the use of the mobile terminal within the safety area can be brought about by virtue of a safety check device that includes a restraining device, for example a cable, a string, a cord and/or an elastic band, restraining the mobile terminal as soon as it adopts a position in the safety area. The restraining device then restrains the mobile terminal in the area outside the safety area. As a result, the mobile terminal cannot even be moved into the safety area.

Alternatively or additionally, it is possible, in accordance with a further embodiment of the method, for the mobile terminal to be returned to the area outside the safety area by the restraining device as a safety check device. The prevention of the use within the safety area is, as a result, caused by the mobile terminal being pulled back, for example. In this case, the restraining device may be an elastic string or a cable, for example, that is attached to an interior equipment component of the motor vehicle, for example the central console or a motor vehicle seat, and has a further end attached to the mobile terminal. As a result, use is immediately prevented, which means that the safety area becomes clear again immediately.

In accordance with a further embodiment of the method, the bringing about of the prevention of the use of the mobile terminal within the safety area can be effected by generating a control signal, wherein the control signal describes a warning message, and the warning message is output by an output device of the mobile terminal or of the motor vehicle. The control signal can in this case be generated by the safety check device. This allows the driver to be warned immediately, and he can then decide himself whether he moves the mobile terminal back into its initial position again or whether he deposits or stows the mobile terminal at a different location, for example.

A control device, for example a controller of the motor vehicle or a microcontroller of the motor vehicle, may be configured to perform one of the embodiments of the method described above. This results in the aforementioned advantages.

In an advantageous embodiment of the automobile, the automobile includes a sensor device, such as a motion sensor and/or a camera and/or a light barrier.

The automobile can furthermore, in accordance with a further particularly advantageous embodiment, have a restraining device for restraining the mobile terminal in an area outside the safety area and/or for returning the mobile terminal to an area outside the safety area. The advantages already cited above are obtained in this case too.

BRIEF DESCRIPTION OF THE DRAWINGS

These and other aspects and advantages will become more apparent and more readily appreciated from the following description of an exemplary embodiment on the basis of the appended drawings of which:

The single FIGURE is a schematic and block diagram illustrating an embodiment of a method for securing an interior of a motor vehicle.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The single FIGURE illustrates the principle of an exemplary embodiment of the method described herein. In this case, a user 10 sits in a vehicle seat as an interior equipment component 12 in a motor vehicle 14, for example in a passenger car. The user 10 is currently driving using a driver assistance system, for example, which executes a fully automated mode of operation, for example. At the same time, the user 10 uses a mobile terminal 16, for example a cell phone, a tablet PC or an electronic book. In the example in the drawing, the user 10 sits opposite a steering wheel, for example, as a further interior equipment component 12. The exemplary steering wheel includes an airbag, for example. The area 18 between the user 10 and the interior equipment component 12 (depicted in dashes in the drawing) is meant to be as clear of items as possible so that, by way of example, a deploying airbag does not move the item or hurl it against the user 10 uncontrolledly by the motor vehicle 14. The area between the interior equipment component 12 and the user 10 is therefore a predetermined safety area 18 that needs to be kept clear. Alternatively or additionally, the predetermined safety area 18 may be an area in a footwell of the motor vehicle 14, for example, and the interior equipment component 12 may in this case include pedals of the motor vehicle 14, that is to say a pedal system including a brake pedal, a gas pedal and/or a declutching fork for a clutch.

The motor vehicle 14 furthermore includes a sensor device 20, a camera, for example, that is arranged on a roof lining of the motor vehicle 14. Alternatively or additionally, the sensor device 20 may include a light barrier, for example, that monitors an area between the two doors of the motor vehicle 14 at a predetermined height, for example. A further example of a sensor of a sensor device 20 includes a transceiver for near field communication, a motion sensor and/or an inclination sensor, for example. If the sensor device 20 includes an inclination sensor, then the latter may be arranged on or in the mobile terminal 16.

Alternatively or additionally, an exemplary sensor device 20 may be mounted in a seat, on a steering wheel, in a door or in a central console, for example. The sensor device 20 may be designed to sense a change of position of the mobile terminal 16.

The single drawing depicts an exemplary movement of the arms of the user 10 and hence a movement of the mobile terminal 16 in the direction of movement P, so that the hands of the user 10 and the mobile terminal 16 pointed from an initial situation, be depicted in the drawings as a dashed position of the mobile terminal 16 and of the arms of the user 10, to an exemplary current position of the mobile terminal 16 and the arms of the user 10, with the mobile terminal 16, in the current attitude, being located within the predetermined safety area 18, for example. The sensor device 20 senses a position of the mobile terminal 16 (S1). In the present example, the sensor device 20 includes a 3D camera, for example, that is designed to capture a position of the mobile terminal 16 and/or a movement of the mobile terminal 16 and/or of the user 10. Within a sensing area of the sensor device 20, illumination can be provided using an infrared lamp of the sensor device 20, for example. If there is an object located therein, then the electromagnetic radiation emitted by the infrared lamp is thrown back to a sensor array. An exemplary sensor array of this kind can then be used to generate 3D image data that indicate 3D coordinates for individual surface area elements of the mobile terminal 16. The 3D image data can then be evaluated by the sensor device 20. The 3D image data from the sensor array of the sensor device 20 may also represent a sequence of successive 3D images, that is to say that the sensor device 20 can also use the infrared sensor to sense movements of the hand of the user 10 and/or of the mobile terminal 16. By tracking a trajectory, for example a fingertip or a device edge, in this 3D image sequence, particularly by tracking a position and a speed of the fingertip or of the device edge, it is thus possible to extrapolate an interpreted movement from the trajectory. Hence, the sensor device 20 can already sense a movement of the mobile terminal 16 in the direction of the safety area 18, for example, even though the mobile terminal 16 is still located outside the safety area 18. The sensor device 20 can perform sensing of the position regularly, for example, to which end a clock cycle or an interval of the sensing may be predetermined, for example.

The motor vehicle 14 furthermore may include a control device 22 and a safety check device 24. The sensor device 20, the control device 22 and/or the safety check device 24 may be connected to one another via a wireless or wired communication link 25, as is known to a person skilled in the art from the related art, in this case. On the basis of the sensed position, the control device 22, for example a controller of the motor vehicle 14 or a microcontroller of the sensor device 20, ascertains whether the mobile terminal 16 adopts a position within the predetermined safety area 18, that is to say whether the mobile terminal 16 is located within the safety area 18 and/or moves into the predetermined safety area 18 and/or moves toward the safety area 18.

The control device 22 is designed to ascertain the position of the mobile terminal 16. When a position within the predetermined safety area 18 to be kept clear exists, as is the case in the example of the drawing, the control device 22 brings about prevention of use of the mobile terminal 16 within the safety area 18 by a safety check device 24. By way of example, this may include changing an operating state of the mobile terminal 16. To this end, the control device 22 can generate a control signal, for example, that is transmitted via a wireless or wired communication link 25 directly into the mobile terminal 16 and causes the mobile terminal 16 to be switched off. In this case, the bringing about of the prevention can be preceded by an activation state of the mobile terminal 16 being sensed, for example, so that the bringing about of the prevention of the use is effected only if the mobile terminal 16 is activated within the safety area 18. It is conceivable, by way of example, for the mobile terminal 16 to be able to be deactivated by preventing a flow of current through a charging cable of the mobile terminal 16, for example.

Alternatively or additionally, the control device 22 can generate a control signal that is transmitted on an output device 26, for example a warning lamp of the motor vehicle 14 or of the mobile terminal 16. In this example, the safety check device 24 may include a microchip of the control device 22.

In the single drawing, the safety check device 24 is embodied as a restraining device. In this case, the safety check device 24 may include a microchip, for example, and also a mechanism for a connection between the mobile terminal 16 and an interior equipment component 12 of the motor vehicle 14. The connection may be embodied as a string and/or a cord and/or a cable and/or an elastic band and/or a shell for fixing the mobile terminal 16, for example, which may have one end connected to the mobile terminal 16 and another end connected to the interior equipment component 12, for example. The connection may include a string and/or a cord and/or an elastic band. These connections are very secure connections. In the example illustrated in the drawing, the connection (depicted in the drawing by a line between the driver's seat and the mobile terminal 16) between the mobile terminal 16 and the interior equipment component 12 is attached to the driver's seat by a retraction mechanism and a spring, for example. When a position is sensed that describes a position of the mobile terminal 16 in the safety area 18 being adopted, the control device 22 can generate a control signal and transmit it to the safety check device 24, the control signal prompting the safety check device 24 to use the retraction mechanism and the one exemplary cord to pull the mobile terminal 16 in the direction of the vehicle seat and hence out of the safety area 18. In this case, the direction of movement is denoted by the arrow S3 in the drawing. The safety check device 24 therefore causes the mobile terminal 16 to be returned to an area outside the safety area 18. The restraining device as safety check device 24 may alternatively or additionally be designed to restrain the mobile terminal 16 in the area outside the safety area 18, for example by a cord and/or a string and/or a cable that has a fixed length, the length preventing the mobile terminal 16 from moving into the safety area 18.

The exemplary embodiment cited above and the cited alternatives sense and ascertain, that is to say detect, a position of the mobile terminal 16, for example an operating part of the motor vehicle manufacturer. When the mobile terminal is used, by way of example, a position beneath an interior equipment component 12, for example beneath a steering wheel and/or an airbag, it is operational, for example. When the mobile terminal 16 is intended to be used or is used in a higher position, for example, that is to say in a predetermined safety area 18 to be kept clear, for example an area between an airbag and a driver, the device 16 is deactivated, for example. The position can be checked by a suitable method in this case, for example in the simplest case by a light barrier as a sensor of a sensor device 20, and/or by near field communication. In this case, a sensor or sensors of the sensor device 20 could be placed in the environment of the driver, for example in the seat and/or in the steering wheel and/or in the door and/or in the central console.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 U1PQ2d 1865 (Fed. Cir. 2004).

The invention claimed is:

1. A method for securing an interior of a motor vehicle, comprising:
    sensing a position of a mobile terminal by a sensor device;
    ascertaining, based on the sensed position by a control device of the motor vehicle, when the mobile terminal moves into and/or toward a predetermined safety area between a predetermined interior equipment component of the motor vehicle and an occupant of the motor vehicle; and
    preventing, when movement of the mobile terminal into or toward the predetermined safety area has been ascertained, use of the mobile terminal within the predetermined safety area by a safety check device under control of the control device, by returning the mobile terminal to an additional area outside the predetermined safety area by a restraining device, including at least one of an elastic band, a string, a cable and a cord, attached to a retraction mechanism configured to pull the mobile terminal out of the predetermined safety area.

2. The method as claimed in claim 1, wherein the sensing of the position of the mobile terminal is effected by sensing a change of position of the mobile terminal, the sensor device including at least one of a motion sensor of the motor vehicle, a near field communication device of the motor vehicle, a camera of the motor vehicle and a light barrier of the motor vehicle.

3. The method as claimed in claim 1,
    wherein the sensing of the position of the mobile terminal is effected by sensing a change of position of the mobile terminal, and
    wherein the sensor device includes a sensor device of the mobile terminal, including at least one of an inclination sensor of the mobile terminal and a near field communication device.

4. The method as claimed in claim 1, wherein the predetermined interior equipment component of the motor vehicle includes at least one of a steering wheel, pedals and a safety system of the motor vehicle, including an airbag.

5. The method as claimed in claim 1, wherein said preventing the use of the mobile terminal within the predetermined safety area is effected by changing an operating state of the mobile terminal.

6. The method as claimed in claim 5,
    further comprising sensing an activation state of the mobile terminal, and
    wherein said preventing includes, if the mobile terminal is activated within the predetermined safety area, deactivating the mobile terminal.

7. The method as claimed in claim 1, wherein said preventing the use of the mobile terminal within the predetermined safety area is effected by the mobile terminal being restrained in an additional area outside the predetermined safety area by at least one of the string, the cord and the elastic band.

8. The method as claimed in claim 1, wherein said preventing the use of the mobile terminal within the predetermined safety area includes generating a control signal to produce a warning message output by an output device.

9. A control device in a motor vehicle having a restraining device and a sensor device capable of sensing position of a mobile terminal relative to an interior equipment component of the motor vehicle, said control device comprising:
    a controller configured to ascertain when the mobile terminal moves into and/or toward a predetermined safety area between the interior equipment component of the motor vehicle and an occupant of the motor vehicle, based on output from the sensor device, and to control the restraining device to return the mobile terminal to an additional area outside the predetermined safety area when movement of the mobile terminal into or toward the predetermined safety area has been ascertained, the restraining device including at least one of an elastic band, a string, a cable and a cord attached to a retraction mechanism configured to pull the mobile terminal out of the predetermined safety area under control of said controller.

10. The control device as claimed in claim 9, wherein said control device generates a control signal to produce a warning message output by an output device.

11. An automobile in which an occupant of the automobile is using a mobile terminal, comprising:
    an interior equipment component;
    a sensor device sensing a position of the mobile terminal;
    a restraining device, including a retraction mechanism and at least one of an elastic band, a string, a cable and a cord; and
    a control device configured to ascertain when the mobile terminal moves into and/or toward a predetermined safety area between the interior equipment component and the occupant, based on output from the sensor device, and to control the restraining device to return the mobile terminal to an additional area outside the predetermined safety area when movement of the mobile terminal into or toward the predetermined safety area has been ascertained.

12. The automobile as claimed in claim 11, wherein the sensor device includes at least one of a motion sensor, a camera and a light barrier.

13. The automobile as claimed in claim 11, wherein the interior equipment includes at least one of a steering wheel, pedals and a safety system of the automobile, including an airbag.

14. The automobile as claimed in claim 11,
    further comprising an output device, and
    wherein said control device generates a control signal to produce a warning message output by the output device.

15. The automobile as claimed in claim 11, wherein the restraining device restrains the mobile terminal in the additional area outside the predetermined safety area or returns the mobile terminal to the additional area outside the predetermined safety area and either a) includes at least one of an elastic band, a string, a cable and a cord, with the retraction mechanism configured to pull the mobile terminal out of the predetermined safety area, or b) includes at least one of the cord, string and cable having a fixed length that prevents the mobile terminal from moving into the predetermined safety area.

\* \* \* \* \*